United States Patent
Wagener et al.

(10) Patent No.: US 7,259,908 B2
(45) Date of Patent: Aug. 21, 2007

(54) ARRANGEMENT OF OPERATING ELEMENTS ON A MICROSCOPE

(75) Inventors: Michael Wagener, Gottingen (DE); Peter Kramer, Mexico City (MX)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 11/241,228

(22) Filed: Sep. 30, 2005

(65) Prior Publication Data
US 2006/0081450 A1    Apr. 20, 2006

(30) Foreign Application Priority Data
Sep. 30, 2004    (DE)    ............... 10 2004 048 100

(51) Int. Cl.
*G02B 21/00*    (2006.01)
(52) U.S. Cl. ....................... 359/368; 74/553
(58) Field of Classification Search ............... 359/368; D13/171; D16/131
See application file for complete search history.

(56) References Cited

U.S. PATENT DOCUMENTS

| | | | |
|---|---|---|---|
| 2,993,410 A * | 7/1961 | Bertell et al. ............... | 359/606 |
| 4,445,758 A * | 5/1984 | Emmel ..................... | 359/392 |
| 5,000,555 A | 3/1991 | Sato | |
| 5,644,425 A * | 7/1997 | Palmer ..................... | 359/409 |
| 5,707,344 A * | 1/1998 | Nakazawa et al. .......... | 600/127 |
| 5,867,313 A * | 2/1999 | Schweitzer et al. ......... | 359/418 |
| 6,275,174 B1 * | 8/2001 | Stork et al. ................. | 341/20 |
| 6,347,784 B1 * | 2/2002 | Philipps-Liebich et al. ... | 251/92 |
| 6,582,377 B1 * | 6/2003 | Van Michaels et al. ..... | 600/551 |
| 2003/0179445 A1* | 9/2003 | Maenle et al. .............. | 359/368 |
| 2004/0027654 A1* | 2/2004 | Gonschor ................... | 359/368 |

FOREIGN PATENT DOCUMENTS

EP    0 763 847 B1    3/1997

* cited by examiner

*Primary Examiner*—Stephone B. Allen
*Assistant Examiner*—Lee Fineman
(74) *Attorney, Agent, or Firm*—Patterson, Thuente, Skaar & Christensen, P.A.

(57) ABSTRACT

What is described is a microscope comprising at least one rotary knob, which is rotatable about an axis of rotation, for operation of actuating elements and comprising a plurality of buttons for control of electrical components, said buttons being arranged in the region of the rotary knob, wherein the buttons comprise operating surfaces, which are located substantially parallel to the axis of rotation and on the outline of the rotary knob, as viewed along the axis of rotation.

13 Claims, 2 Drawing Sheets

ARRANGEMENT OF OPERATING ELEMENTS ON A MICROSCOPE

BACKGROUND

The invention relates to a microscope comprising at least one rotary knob, which is rotatable about an axis of rotation, for operating an actuating element and comprising several buttons arranged in the vicinity of the rotary knob, said buttons serving to control electrical components.

Such a microscope is known, for example, from U.S. Pat. No. 5,000,555 wherein a rotary knob for focus operation is provided on the stand of the microscope, said handle being surrounded by a plurality of electric buttons. The buttons are associated with the fingers of the hand of an operator. Thus, for example, one button is provided for the thumb. This button is located on a housing part which surrounds the coarse focusing rotary handle around 120°. Using the ball of the thumb, the operator can operate the rotary handle within the remaining sector, which is about 60° in size, for coarse focusing, while at the same time reaching the corresponding push button located above the rotary handle. Further push buttons are also located on the housing part surrounding the coarse adjustment rotary handle. In contrast to the button provided for the thumb, which button is operated in a direction substantially perpendicular to the axis of rotation of the rotary handle, the direction of operation of these push buttons is substantially parallel to the axis of rotation, so that they may be conveniently reached by the middle, ring and little fingers when the ball of the thumb is placed on the rotary handle for coarse adjustment. In the operational concept of U.S. Pat. No. 5,000,555, the index finger is intended to operate the setwheel for fine adjustment of focus, said wheel clearly protruding relative to the rotary handle for coarse adjustment and the housing part with the buttons.

Thus, the above concept allows one button each to be associated with each finger of the hand. A maximum of four buttons is possible, because the index finger is used for fine focusing.

However, it has turned out that this operational concept is not always satisfactory. Moreover, in terms of design, the limitation to four buttons is inconvenient. Therefore, it is an object of the invention to improve a microscope of the above-mentioned type so as to achieve an ergonomic arrangement of push buttons for ergonomically favorable control of electrical components and without limitation to four push buttons.

SUMMARY OF THE INVENTION

In order to achieve the above object, the invention provides a microscope comprising at least one rotary knob, which is rotatable about an axis of rotation, for operation of actuating elements and comprising a plurality of buttons for control of electrical components, said buttons being arranged in the vicinity of the rotary knob and comprising operating surfaces, which are located substantially parallel to the axis of rotation and on the outline of the rotary knob, as viewed along the axis of rotation.

Thus, in contrast to the aforementioned known approach, the invention leaves the rotary knob completely free and arranges the buttons staggered along the axis of rotation as well as with operating surfaces arranged parallel to the axis of rotation, such that the operating surfaces substantially join up with the rotary knob along the axis of rotation. Since the fingers need not rest on the buttons all the time, the number of buttons may be considerably much larger than possible in the prior art. Thus, the arrangement according to the invention allows to provide many more buttons than in the prior art.

Surprisingly, the construction according to the invention additionally allows the rotary knob to be grasped in almost any desired manner. The hand and, in particular, the fingers of the hand need no longer be lifted from the rotary knob in order to allow operation of the buttons. The compulsory position of the hand as given in the prior art is thus eliminated. A user may now grasp the rotary knob as desired. It is possible, in particular, to grasp the rotary knob in a manner allowing several fingers to contact the peripheral surface of the rotary knob substantially parallel to the axis of rotation. Operation of the push buttons may be achieved by simply shifting the fingers toward the microscope, i.e. along the axis of rotation.

Moreover, the invention enables not only push buttons, as provided in the prior art, but a particularly great variety of buttons which, in the sense of the invention, are understood to be any kind of electrical operating mechanism. Thus, mechanically responding buttons as well as touch buttons are conceivable. The buttons may also be provided as rockers, toggle switches, momentary-contact switches or setwheels.

The arrangement of the buttons according to the invention may be realized in a microscope by providing the stand with an attachment having the outline of the rotary knob. In order to be able to provide the construction according to the invention also in existing designs of stands, in particular without changing molds, it is convenient to arrange the buttons in an intermediate ring, which is located between the microscope housing and the rotary knob. On a conventional microscope, said intermediate ring may be inserted between the housing and the rotary knob or the setwheel. This makes operating elements easily accessible for all fingers without having to let go of the rotary knob.

If there is a functional association between buttons, e.g. for rotating an objective revolver back and forth, it is convenient to provide tangible marks, which identify such functionally associated buttons. An example of such a tangible mark is an elevation arranged between two buttons, said elevation signaling to the user in a tactile manner that the adjacent buttons are associated with each other in the manner of a rocker.

It is also possible to provide the operating surfaces of several buttons with different surfaces, so as to individualize buttons in a manner recognizable by the tactile sense. For example, they may have different curvatures (concave, convex, etc.), or may be provided with engravings allowing to recognize buttons having different functions.

In the aforementioned realization by means of an intermediate ring, it is possible for the user to adjust the positions of the buttons if the intermediate ring is fixable in different rotational positions about the axis of rotation. This may be achieved, for example, by enabling the rotary knob with the intermediate ring to be released from the microscope and to be placed thereon in different angular positions.

An intermediate ring that can be infinitely adjusted in different rotational positions and fixed in any desired rotational position is particularly comfortable. In one embodiment, the intermediate ring is rotatably supported on the housing and can be fixed by means of a clamping mechanism, e.g. a setscrew or a clamping wedge (in particular, by means of a clamping slide located in the peripheral surface of the intermediate ring).

DESCRIPTION OF THE FIGURES

The invention will be explained in more detail below, by way of example and with reference to the Figures, wherein.

DETAILED DESCRIPTION

Figure 1:
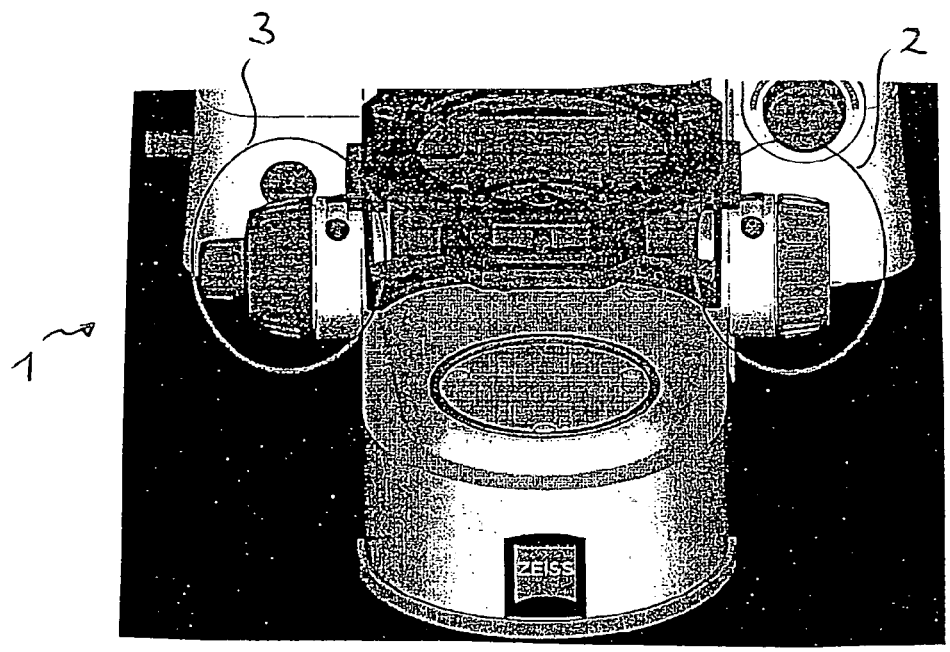
FIG. 1 shows a perspective view of a microscope in the area of the focus adjustment system.

FIG. 1 shows a perspective view of the lower part of a microscope stand on which a rotary knob 2 or a setwheel unit 3 for focus adjustment is provided in a conventional manner. The setwheel unit 3 comprises a large setwheel for fine adjustment as well as, arranged coaxially thereto, a setwheel for coarse adjustment. In the described embodiment, the rotary knob 2 merely has a single-step design for fine adjustment; for the following description, it is only important that the rotary knob 2 is operated by rotation.

Figure 2:
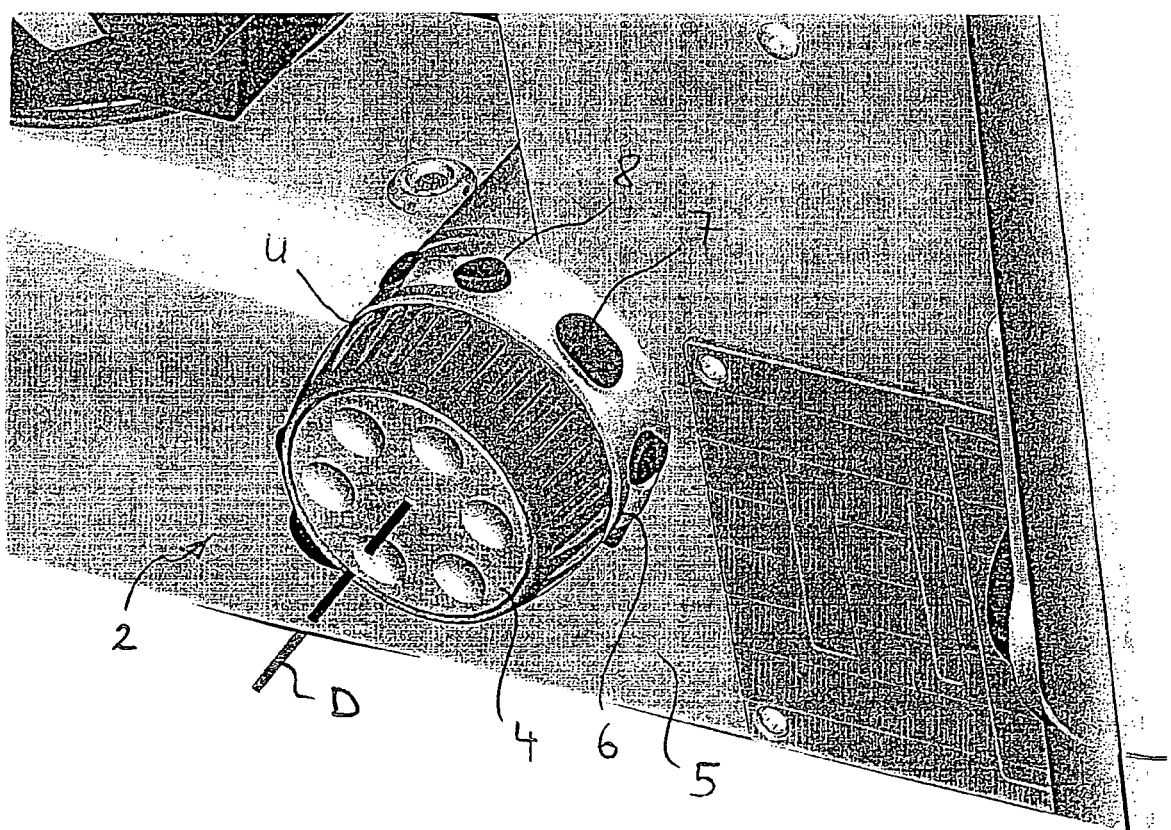
FIG. 2 shows a perspective view of a rotary knob of the microscope of FIG. 1.

Both in the setwheel unit 3 and in the rotary knob 2, an intermediate ring 6 is inserted between the setwheel unit or the rotary knob and the housing wall of the microscope stand, said intermediate ring 6 being shown, by way of example, for the rotary knob 2 in FIG. 2. The intermediate ring 6 is arranged between the head 4 of the rotary knob 2 and has an external diameter that corresponds substantially to the external diameter of the head 4. In this manner, the intermediate ring 6 continues the outline U of the head 4 toward the housing wall 5 of the microscope.

Buttons 7 comprising operating surfaces 8 are arranged in the wall of the intermediate ring. Since the diameter of the intermediate ring 6 substantially corresponds to the diameter of the head 4, the operating surfaces 8 are located on the outline U of the rotary knob 2 as viewed in the direction of the axis of rotation D of the head 4. Thus, by operating the rotary knob 2 at its head 4, the user can easily reach the buttons 7 by moving the fingers placed on the head 4 toward the intermediate ring 6, so that he can place his fingertips on the buttons 7.

The diameters of the head 4 and of the intermediate ring 6 need not be exactly identical; it is merely important that the buttons can be reached without having to lift the fingers to a great and, thus, inergonomical extent from the head 4 of the rotary knob 2. A step of e.g. 1 cm is, therefore, absolutely tolerable.

Thus, operation via the rotary knob of the microscope requires the operator to place the fingers of his hand substantially parallel to the axis of rotation D of the rotary knob. The buttons can be reached by simple displacement of the fingertip in the direction of the microscope stand. Moreover, it has been shown that this manner of grasping the rotary knob enables a much more sensitive operation of the rotary knob.

The buttons are located on the intermediate ring, which may also be replaced by an attachment on the microscope housing, such that their direction of operation is substantially perpendicular to the axis of rotation. Soft pressure applied by the fingertip will then allow operation of the button without having to release the head 4 of the rotary knob 2.

Figure 3:
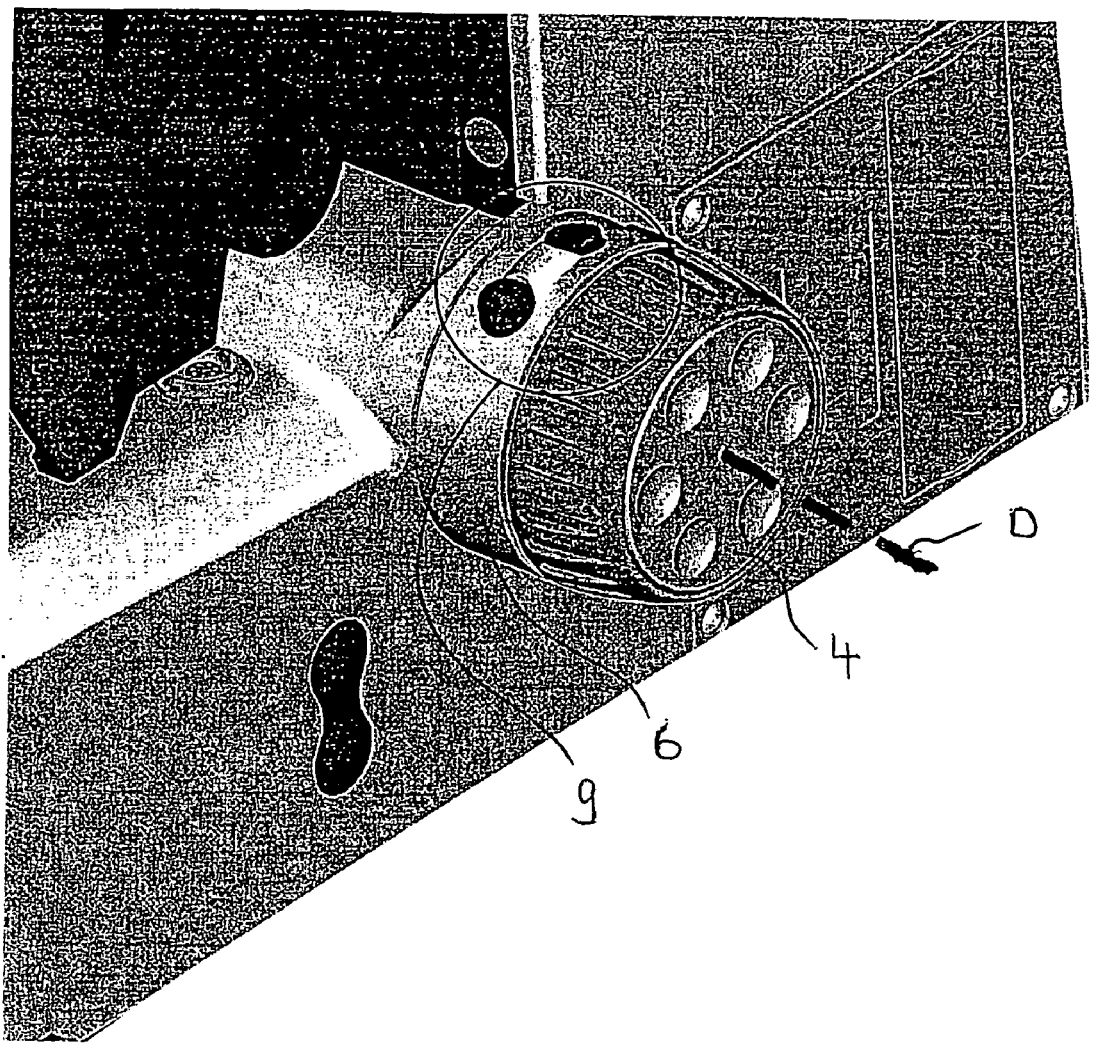
FIG. 3 shows an alternative embodiment of the rotary knob of FIG. 2.

The buttons 7 may be provided as push buttons, toggle switches or, as shown in FIG. 3, as functionally associated rockers.

FIGS. 2 and 3 clearly show that the number of buttons in the intermediate ring 6 may be varied according to the design of the microscope 1. FIG. 3 also shows that an elevation between the two buttons of the rocker identifies both buttons as being functionally associated.

As shown in FIG. 1, the setwheel unit 3 may also be provided with an intermediate ring of the above-described type.

The invention claimed is:

1. A microscope comprising at least one rotary knob, wherein said rotary knob is rotatable about an axis of rotation for operation of actuating elements, and also comprising a plurality of buttons for control of electrical components, said buttons being arranged in the vicinity of the rotary knob, wherein said buttons comprise operating surfaces, which are located substantially parallel to the axis of rotation and substantially on the outline of the rotary knob, as viewed along the axis of rotation wherein said buttons are arranged in an intermediate ring between the microscope housing and the rotary knob.

2. The microscope as defined in claim 1, wherein the intermediate ring comprises the buttons and is fixable in different rotational positions about the axis of rotation.

3. The microscope as defined in claim 2, wherein the intermediate ring is infinitely adjustable about the axis of rotation, and further comprises a mechanism for fixing the intermediate ring in a set rotary position.

4. The microscope as described in claim 1, further comprising tangible marks which identify functionally associated buttons.

5. The microscope as defined in claim 1, wherein the buttons comprise at least one of the following: a rocker, a toggle switch, a momentary-contact switch, or a setwheel.

6. The microscope as defined in claim 1, wherein the operating surfaces of two or more said buttons differ with respect to their surface structure, so as to individualize the buttons in a tactile manner.

7. A microscope comprising:

a stand portion;

at least one rotary knob extending from the stand, wherein said rotary knob is rotatable about an axis of rotation for operation of actuating elements;

at least one intermediate ring or an attachment on a microscope housing positioned coaxially about the rotary knob axis of rotation and located between the stand and the rotary knob;

a plurality of buttons for control of electrical components, said buttons located on said intermediate ring or said attachment wherein said buttons comprise operating surfaces, which are located substantially parallel to the axis of rotation and substantially on the outline of the rotary knob, as viewed along the axis of rotation.

8. The microscope as defined in claim 7, wherein the intermediate ring is fixable in different rotational positions about the axis of rotation.

9. The microscope as defined in claim 7, wherein the intermediate ring is infinitely adjustable about the axis of rotation, and further comprises a mechanism for fixing the intermediate ring in a set rotary position.

10. The microscope as described in claim 7, further comprising tangible marks which identify functionally associated buttons.

11. The microscope as defined in claim 7, wherein the buttons comprise at least one of the following: a rocker switch, a toggle switch, a momentary-contact switch, or a setwheel.

12. The microscope as defined in claim 7, wherein the operating surfaces of two or more said buttons differ with respect to their surface structure, so as to individualize the buttons in a tactile manner.

13. The microscope as defined in claim 7, wherein the rotary knob comprises a head portion such that a diameter of said head portion is substantially equal to a diameter of said intermediate ring.

* * * * *